United States Patent [19]

Suchoza et al.

[11] Patent Number: 4,782,696
[45] Date of Patent: Nov. 8, 1988

[54] MEASURING AXIAL PUMP THRUST

[75] Inventors: Bernard P. Suchoza, McMurray; Imre Becse, Washington, both of Pa.

[73] Assignee: The United States of America as represented by the United States Department of Energy, Washington, D.C.

[21] Appl. No.: 23,097

[22] Filed: Mar. 6, 1987

[51] Int. Cl.[4] .............................................. G01L 5/12
[52] U.S. Cl. ...................................... 73/168; 73/862.49
[58] Field of Search .............................. 73/168, 862.49

[56] References Cited

U.S. PATENT DOCUMENTS

| | | | |
|---|---|---|---|
| 3,100,989 | 8/1963 | Jones | 73/862.49 X |
| 3,287,966 | 11/1966 | Haan et al. | 73/862.49 X |
| 3,665,758 | 5/1972 | Tiller | 73/862.31 X |
| 3,763,700 | 10/1973 | MacDonald | 73/862.49 |
| 3,782,186 | 1/1974 | Burch et al. | 73/862.49 |
| 3,828,610 | 8/1974 | Swearingen, II | 73/862.49 |
| 4,182,168 | 1/1980 | Desch | 73/862.49 |
| 4,287,758 | 9/1981 | Swearingen | 73/862.49 |
| 4,432,246 | 2/1984 | Granat | 73/862.54 X |
| 4,435,988 | 3/1984 | Corry et al. | 73/862.31 X |

Primary Examiner—Daniel M. Yasich
Attorney, Agent, or Firm—Earl T. Reichert; Judson R. Hightower; Richard E. Constant

[57] ABSTRACT

An apparatus for measuring the hydraulic axial thrust of a pump under operation conditions is disclosed. The axial thrust is determined by forcing the rotating impeller off of an associated thrust bearing by use of an elongate rod extending coaxially with the pump shaft. The elongate rod contacts an impeller retainer bolt where a bearing is provided. Suitable measuring devices measure when the rod moves to force the impeller off of the associated thrust bearing and the axial force exerted on the rod at that time. The elongate rod is preferably provided in a housing with a heat dissipation mechanism whereby the hot fluid does not affect the measuring devices.

12 Claims, 1 Drawing Sheet

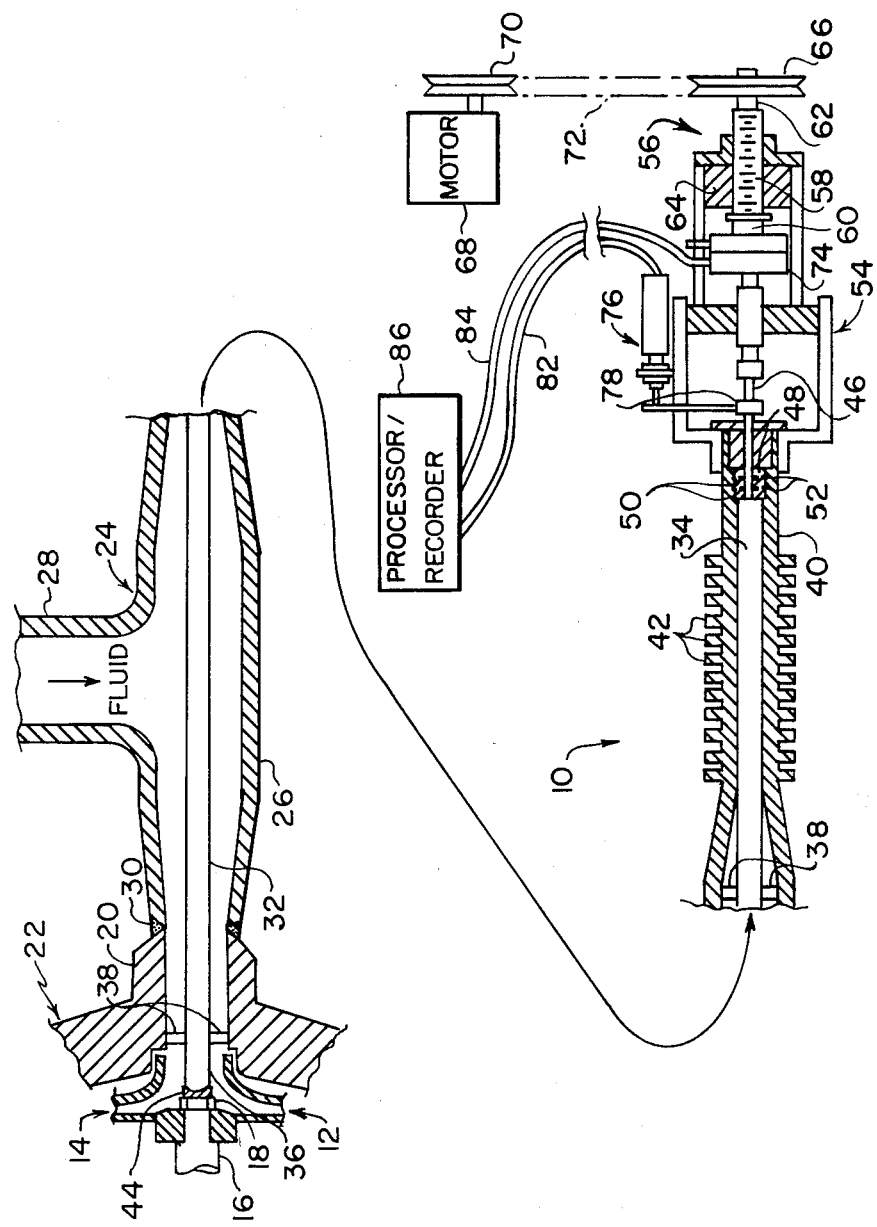

MEASURING AXIAL PUMP THRUST

The U.S. Government has rights in this invention pursuant to Contract No. DE-AC11-76PN00014 between the U.S. Department of Energy and Westinghouse Electric Corporation.

FIELD OF THE INVENTION

The present invention relates generally to the measuring of hydraulic axial thrust of a pump, and more particularly to the measuring of such an axial thrust by forcing a rotating impeller mounted on a rotating shaft off of an associated impeller thrust bearing while the pump is pumping a pressurized hot fluid.

BACKGROUND OF THE INVENTION

In centrifugal pumps, as well as in axial pumps, unbalanced forces act on the impeller in the axial direction. This axial force on the impeller is counterbalanced by one of several methods, such as by providing double suction, a balancing drum, or a balancing disc. In practice, however, some slight unbalance still exists. Then, to prevent unstable impeller conditions, a single or a double directional axial thrust bearing is included in the pump to support the axial forces produced.

It is important that the calculated axial thrust values for a pump be verified by actual measurements to assure that the bearing loads are within allowable limits. Although manufacturers typically perform thrust measurements at room temperature for this reason, the manufacturers are not equipped to measure the thrust at temperatures and pressures typical of those encountered with pumps circulating fluid in a nuclear reactor.

One type of axial thrust measuring device is used by the Lawrence Pump and Engine Company. This device is designed for use in an ambient atmosphere essentially at room temperature and nonpressurized (open tank suction). In order to use this device a short extension rod is welded to the impeller bolt. This extension rod thus rotates with the pump impeller and is supported by an outboard bearing at the end of an inlet Tee on the suction side. A force measurement of axial thrust is accomplished using a force transducer at the end of the rotating shaft and a manual lever arm is used to apply an axial load to the rotating shaft. A sufficient load is applied to the rotating extension to provide a lift-off force of the rotor from the associated axial thrust bearing.

The Lawrence Pump and Engine Company device was an in-house fixture designed for use at room temperature plus the differential pressure of the pump only, whereas the subject invention is designed for use at a differential pressure of 2000 p.s.i. or more, and at elevated temperatures, i.e., temperatures substantially higher than room temperatures. In addition, this the subject invention uses a fixed shaft as opposed to a rotating shaft in the "Lawrence device".

Disclosed in U.S. Pat. No. 4,287,758 (Swearingen) is an apparatus for measuring thrust loads on a rotatably mounted shaft in contact with a rotor of a centrifugal compressor. The shaft is subjected to the loads from the rotor, and a proximity transducer monitors the actual movement of the shaft to determine a thrust loading readout. The use of an LVDT (Linear Voltage Differential Transformer) to measure the end thrust or torque of a rotating shaft is disclosed in U.S. Pat. No. 4,182,168 (Desch). The use of load cells to measure axial force of a thrust bearing housing against an outer casing is disclosed in U.S. Pat. No. 3,763,700 (MacDonald). This axial force measurement is made while the rotor of a steam turbine is rotating.

In U.S. Pat. No. 3,665,758 (Tiller), a device for measuring the thrust preload applied by spring washers against bearings mounted on a rotatable armature shaft of a high speed motor is disclosed. The exposed end of the rotatable shaft is aligned with and coupled to a rod extending to a load cell. Other apparatuses of general interest which are used for measuring torque are disclosed in the following U.S. Pat. Nos. 3,782,186 (Burch et al); 3,828,610 (Swearingen); 4,432,246 (Granat); and 4,435,988 (Corry et al).

SUMMARY OF THE INVENTION

In accordance with the present invention, an apparatus for measuring hydraulic axial thrust of a pump which is pumping a pressurized hot fluid is provided. The axial thrust is measured by forcing a rotating impeller mounted on a rotating shaft off of an associated impeller thrust bearing of the pump. The pump includes a suction port located adjacent the impeller and axially upstream from a distal end of the rotating shaft. An impeller retainer bolt is located on the distal end of this pump shaft for rotation therewith. This bolt includes a distal end adjacent the suction port which is engaged to lift the impeller off of the associated thrust bearing. An elongate rod which extends coaxially away from the pump shaft includes a distal end and a proximal end adjacent the distal end of the bolt. The suction port of the pump is connected by a fluid connector means to a source of the fluid. The fluid connector means includes a housing surrounding the distal end of the elongate rod and a mounting means for mounting the distal end of the rod for reciprocal axial movement in the housing. A force means extends through the housing and engages the distal end of the rod in order to force the rod coaxially and nonrotatable toward the bolt in order to lift the impeller from the associated thrust bearing. A bearing means is provided between the distal end of the bolt and the proximal end of the rod for frictionlessly transmitting the axial force exerted on the nonrotating rod by the force means to the rotating retainer bolt and associated shaft. A measuring means is then provided for measuring the axial force exerted by the force means on the rod which is needed to lift the impeller from the associated thrust bearing, which force is equal to the hydraulic axial thrust created by the pump when it is pumping a pressurized hot fluid.

In a preferred embodiment of the present invention, the housing includes a heat dissipation means adjacent the distal end of the rod for dissipating heat from the distal end of the rod. By use of a heat dissipation means, the heat from the hot pumped fluid is not conducted to the measuring means to adversely affect the measurement thereof. The heat dissipation means preferably includes a reduced portion of the surrounding housing closely adjacent the distal end of the rod on which fins extending from the reduced portion are located.

The bearing means is preferably a graphite bearing surface attached to the retainer bolt. The fluid connector is also preferably a Tee member with the fluid being conducted along a leg of the Tee member and the housing being part of an arm of the Tee member. Conveniently, the force means includes a reduced portion of the rod extending through an aperture in the housing. A seal means is provided around the reduced portion of the rod for sealing this aperture. The force means further includes a load screw and a bracket which is attached to the housing and in which the load screw is rotatably mounted. A motor means is then provided for rotating the load screw relative to the bracket to selectively increase or reduce the force exerted on the reduced portion of the rod by the load screw.

The measuring means preferably includes an electronic displacement transducer means for determining a displacement of the reduced portion of the rod when the impeller is moved off of the associated thrust bearing. An electronic load cell means then measures an applied force on the reduced portion of the rod when the displacement transducer means determines that the impeller has moved off of the associated thrust bearing. This determined applied force is thus equal to the hydraulic axial thrust of the pump.

It is an advantage of the present invention that the axial thrust produced by the operation of a pump is measured while the pump is pumping a pressurized hot fluid such as will be encountered by the pump in actual operating conditions. In addition, the thrust measurement can be made using operating conditions of temperature and pressure up to the maximum design operating limits if desired.

It is also an advantage of the present invention that the measurement of axial thrust is made quickly and efficiently.

Other features and advantages of the present invention are stated in or apparent from a detailed description of a preferred embodiment of the invention found hereinbelow.

BRIEF DESCRIPTON OF THE DRAWING

The single FIGURE is a schematic cross-sectional elevation view of the axial thrust measuring apparatus of the present invention.

DETAILED DESCRIPTION OF THE PREFERRED EMBODIMENT

With reference now to the drawing, a pump thrust measuring apparatus 10 is depicted together with a portion of a pump 12. Pump 12 includes an impeller 14 mounted on a rotating shaft 16. A thrust bearing (not shown) is provided to support the axial thrust produced by operation of pump 12. Impeller 14 is maintained on shaft 16 by use of a retainer bolt 18. As shown, retainer bolt 18 is located opposite an inlet port 20 of pump volute 22.

Suitably attached to pump volute 22 at inlet port 20 is a Tee member 24. Tee member 24 includes an arm 26 which extends coaxially about the elongate axis of shaft 16 and a leg 28 which extends perpendicular to arm 26. Leg 28 is suitably attached to a fluid circulation loop including a means for raising the temperature of the fluid being circulated and a means for maintaining a pressure in the circulation loop. If desired, pump 12 is installed in an operating system for which pump 12 is designed such that the axial thrust generated by pump 12 is measured under actual operating conditions. Alternatively, a special circulation loop in which pump 12 is inserted is provided to test pump 12 under operating conditions which are selectively chosen. Tee member 24 is attached to inlet port 20 by welds 30 or alternatively by suitable attaching bolts.

Extending coaxially away from shaft 16 is an elongate rod 32. Rod 32 includes a distal end 34 and a proximal end 36 which is located immediately adjacent a distal end of retainer bolt 18. As shown, rod 32 is mounted for reciprocal movement in arm 26 of Tee member 24 by radial projections 38. Adjacent distal end 34 of rod 32, arm 26 which serves as a housing for rod 32 includes a reduced portion 40 provided with exterior radial fins 42.

Located on the distal end of retainer bolt 18 is a bearing means 44. Bearing means 44, which has a graphite bearing surface, rotates with retainer bolt 18 and is designed to be frictionlessly engaged by proximal end 36 of rod 32 which does not rotate. Preferably, rod 32 is a chrome plated shaft and bearing means 44 is a carbon graphite bearing disc or thrust pad.

Distal end 34 of rod 32 includes a reduced extension 46. Extension 46 extends through an aperture in a sealing means 48. Sealing means 48 includes dual sets of interior O-rings 50 and exterior O-rings 52 to prevent any loss of pressure or fluid in arm 26.

Mounted to the distal end of reduced portion 40 of Tee member 24 is a bracket means 54. Mounted to bracket means 54 is a force means 56 for exerting a force on the distal end of extension 46 of rod 32. Force means 56 includes a load screw 58 having a proximal end 60 in abutment with the distal end of extension 46 and a distal end 62. Load screw 58 is threadably received in a block 64 securely mounted to bracket means 54. Distal end 62 of load screw 58 has a pulley 66 mounted thereon. Pulley 66 is suitably driven in rotation by a variable speed reversible DC motor 68. Motor 68 has a pulley 70 associated therewith, and a V-belt 72 or similar drive means extends between pulleys 66 and 70. Thus, by rotation of pulleys 66 and 70 by motor 68, load screw 58 is moved toward or away from rod 32. Similarly, after distal end 62 of load screw 58 contacts extension 46 of rod 32 and proximal end 36 of rod 32 is forced into abutment with bearing means 44, further movement of load screw 58 towards rod 32 causes a loading of rod 32 and a corresponding force to be exerted on bearing means 44.

Suitably mounted to bracket means 54 is a load cell 74. Load cell 74 is located adjacent a portion of load screw 58 and measures the axial force in load screw 58 which is exerted on rod 32. Load cell 74 produces an electrical signal indicative of the measured force over line 82. Also mounted to bracket means 54 is a linear variable displacement transducer (LVDT) 76 having a sensor 78 surrounding extension 46 of rod 32. LVDT 76 is used to measure the axial displacement of rod 32 and to produce an electrical signal indicative thereof over line 84. A noticeable displacement of rod 32 occurs when load screw 58 exerts a force on rod 32 sufficient to lift impeller 14 off of the associated thrust bearing. Thus, it should be appreciated that when LVDT 76 senses a significant movement of rod 32 corresponding to the lifting of impeller 14 off of the associated thrust bearing, the force measurement of load cell 74 is therefore the force required to lift impeller 14 off of the associated thrust bearing. This determination is conveniently made by and permanently recorded by a processor/recorder 86.

In operation, pump thrust measuring apparatus 10 operates in the following manner to determine the hydraulic axial thrust of pump 12 under operating conditions. Initially, pump 12 is operated with proximal end 36 of rod 32 slightly out of contact with bearing means 44. As impeller 14 in pump 12 rotates, the associated fluid is pumped from leg 28 of Tee member 24 to impeller 14 and back into the associated fluid loop. During this time period, the fluid being pumped is raised to the operating temperature and pressure. Once the operating conditions have been achieved, load cell 74 and LVDT 76 are actuated as motor 68 causes load screw 58 to advance towards rod 32 by the appropriate rotation of pulley 66. Thus, load screw 58 eventually contacts extension 46 of rod 32 and pushes against extension 46 until proximal end 36 of rod 32 engages bearing means 44. It should be appreciated that bearing means 44 is needed because retainer bolt 18 is rotating with impeller 14 while rod 32 is not rotating but is merely moved slightly axially.

Further rotation of load screw 58 causes an increasing force to be exerted on rod 32 and hence to be exerted on shaft 16 of impeller 14. This increasing force is sensed by load cell 74. When the force exerted by load screw 58 slightly exceeds the hydraulic axial thrust of impeller 14, impeller 14 is lifted off of the associated thrust bearing and rod 32 is correspondingly moved. This sudden movement of rod 32 is sensed by LVDT 76. Thus, at the moment that LVDT 76 senses the movement of rod 32, a readout of load cell 74 by processor/recorder 86 indicates the hydraulic axial thrust of impeller 14. As soon as the measurement of the hydraulic axial thrust of impeller 14 has been made, motor 68 is immediately reversed to unload rod 32 and to move proximal end 36 out of bearing contact with bearing means 44.

It should be appreciated that both load cell 74 and LVDT 76 are relatively temperature sensitive. Thus, where the fluid being pumped by impeller 14 is heated, radial fins 42 on reduced portion 40 serve to cool reduced portion 40. This helps prevent load cell 74 and LVDT 76 from being heated by the circulating fluid and from having the measurements made by load cell 74 and LVDT 76 adversely affected.

Using pump thrust measuring apparatus 10, the hydraulic axial thrust of a pump rotating at 3,450 rpm has been measured. When pumping water at approximately 680° F., the measured hydraulic axial thrust was 60 lbs. This contrasts with a measured value of 350 lbs. at a loop temperature of 96° F. Thus, it has been shown that the increase in temperature of the fluid has a profound effect on measured thrust. Further measurements indicate that a large majority (approximately 70%) of the thrust decrease occurs in the 500° to 680° F. range for the tested pump. It is assumed that this decrease in thrust is explained in part by the changes in fluid density of the water as the water is heated and the thermal growth in critical dimensions of the pump parts as the temperature increased. Increasing of loop pressure was also shown to have a minimal effect on pump thrust.

During these tests, the duration of the measurement was approximately 5 seconds from the actuation of motor 68 until the reversal of motor 68 after the measurement was made. Thus, it should be appreciated that a quick and efficient measurement is made, which produces little wear of bearing means 44. In addition, LVDT 76 and load cell 74 produced signals which were suitably processed and permanently recorded so that subsequent careful analysis was allowed.

Although pump thrust measuring apparatus 10 has been disclosed as using a motor 68 and associated load screw 58 to exert a force on rod 32, it should be appreciated that other force supplying means are possible. In particular, a manually operated force means, including a simple lever to exert a manual force on rod 32, is possible.

Thus, while the present invention has been described with respect to an exemplary embodiment thereof, it will be understood by those of ordinary skill in the art that variations and modifications can be effected within the scope and spirit of the invention.

We claim:

1. An apparatus for measuring hydraulic axial thrust of a pump which is pumping a pressurized hot fluid, which thrust is measured by causing axial displacement of a rotating impeller mounted on a rotating shaft, where the pump includes a suction port located adjacent the impeller and axially upstream from a distal end of the rotating shaft, said apparatus comprising:

an impeller retainer bolt attached on the distal end of the rotating shaft for rotation therewith, said bolt including a distal end adjacent the suction port, the retainer bolt being engagable to cause axial displacement of the impeller;

an elongate rod which extends coaxially away from the rotating shaft, said rod including a distal end and a proximal end adjacent said distal end of said bolt;

a fluid connector means for fluidly connecting the fluid to the suction port, said connector means including a housing surrounding said distal end of said rod and a mounting means for mounting said distal end of said rod for reciprocating axial movement in said housing;

a force means extending through said housing which engages said distal end of said rod for forcing said rod coaxially and nonrotatably toward said bolt in order to cause axial displacement of the impeller;

a bearing means provided between said distal end of said bolt and said proximal end of said rod for frictionlessly transmitting the axial force exerted on said nonrotating rod to said rotating bolt; and a measuring means for measuring the axial thrust force exerted by said force means on said rod in order to cause axial displacement of the impeller.

2. An apparatus for measuring axial thrust as claimed in claim 1 wherein said housing includes a heat dissipation means adjacent said distal end of said rod for dissipating heat from said distal end of said rod such that heat from the hot pumped fluid is not significantly conducted to said measuring means.

3. An apparatus for measuring axial thrust as claimed in claim 2 wherein said heat dissipation means includes a reduced portion of said surrounding housing closely adjacent to said distal end of said rod and convection fins extending from said reduced portion.

4. An apparatus for measuring axial thrust as claimed in claim 1 wherein said bearing means is a graphite bearing surface attached to said bolt.

5. An apparatus for measuring axial thrust as claimed in claim 1 wherein said fluid connector is a Tee member with the fluid being conducted along a leg of said Tee member and said housing is part of an arm of said Tee member.

6. An apparatus for measuring axial thrust as claimed in claim 1 wherein said force means includes a reduced portion of said distal end of said rod, an aperture in said housing through which said reduced portion extends, and a seal means around said reduced portion of said rod for sealing said aperture.

7. An apparatus for measuring axial thrust as claimed in claim 6 wherein said force means further includes a load screw, a bracket which is attached to said housing and in which said load screw is rotatably mounted, and a motor means for rotating said load screw relative to said bracket to selectively increase and reduce the force exerted on said reduced portion of said rod.

8. An apparatus for measuring axial thrust as claimed in claim 6 wherein said measuring means includes a displacement means for determining a displacement of said reduced portion of said rod when the impeller is axially displaced, and a load means for measuring an applied force on said reduced portion of said rod when said displacement means determines that the impeller has been axially displaced.

9. An apparatus for measuring axial thrust as claimed in claim 1 wherein said measuring means includes a displacement means for determining a displacement of said rod when the impeller is axially displaced, and a load means for measuring an applied force on said rod when said displacement means determines that the impeller has been axially displaced.

10. An apparatus for measuring hydraulic axial thrust of a pump which is pumping a pressurized hot fluid, which thrust is measured by causing axial displacement of a rotating impeller mounted on a rotating shaft, where the pump includes a suction port located adjacent the impeller and axially upstream from a distal end of the rotating shaft, said apparatus comprising:

an impeller retainer bolt attached on the distal end of the rotating shaft for rotation therewith, said bolt including a distal end adjacent the suction port, the retainer bolt being engagable to cause axial displacement of the impeller;

an elongate rod which extends coaxially away from the rotating shaft, said rod including a distal end and a proximal end adjacent said distal end of said bolt;

a fluid connector means for fluidly connecting the fluid to the suction port, said connector means including (a) a Tee member with the fluid being conducted along a leg of said Tee member and with an arm of said Tee member forming a housing surrounding said distal end of said rod, (b) a mounting means for mounting said distal end of said rod for reciprocating axial movement in said housing, and (c) a heat dissipation means adjacent said distal end of said rod for dissipating heat from said distal end of said rod and the surrounding housing;

a force means extending through said housing which engages said distal end of said rod for forcing said rod coaxially and nonrotatably toward said bolt in order to axially displace the impeller, said force member including a reduced portion of said distal end of said rod, an aperture in said housing through which said reduced portion extends, and a seal means around said reduced portion of said rod for sealing said aperture;

a graphite bearing attached to said distal end of said bolt and said prioximal end of said rod for frictionlessly transmitting the axial force exerted on said nonrotating rod to said rotating bolt; and a measuring means for measuring the axial force exerted by said force means on said rod in order to cause axial movement of the impeller, said measuring means including an electronic displacement transducer means for determining a displacement of said reduced portion of said rod when the impeller is axially displaced and an electronic load cell means for measuring an applied force on said reduced portion of said rod when said displacement transducer means determines that the impeller has been axially displaced sufficiently.

11. An apparatus for measuring axial thrust as claimed in claim 10 wherein said heat dissipation means includes a reduced portion of said surrounding housing closely adjacent to said distal end of rod and convection fins extending from said reduced portion.

12. An apparatus for measuring axial thrust as claimed in claim 11 wherein said force means further includes a load screw, a bracket which is attached to said housing and in which said load screw is rotatably mounted, and a motor means for rotating said load screw relative to said bracket to selectively increase and reduce the force exerted on said reduced portion of said rod.

* * * * *